United States Patent
Glodis et al.

[11] Patent Number: 6,122,935
[45] Date of Patent: Sep. 26, 2000

[54] HIGH RATE MCVD METHOD OF MAKING AN OPTICAL FIBER PREFORM

[75] Inventors: Paul Francis Glodis, Atlanta, Ga.; Katherine Theresa Nelson, Gillette, N.J.; Kim Willard Womack, Duluth, Ga.; Man Fei Yan, Berkeley Heights, N.J.

[73] Assignee: Lucent Technologies Inc., Murray Hill, N.J.

[21] Appl. No.: 09/112,069

[22] Filed: Jul. 8, 1998

[51] Int. Cl.⁷ .................................................. C03B 37/027
[52] U.S. Cl. ................................................ 65/384; 65/417
[58] Field of Search .............................. 65/417, 418, 419, 65/420, 384

[56] References Cited

U.S. PATENT DOCUMENTS

| | | | |
|---|---|---|---|
| 4,217,027 | 8/1980 | MacChesney et al. | 350/96.3 |
| 4,233,045 | 11/1980 | Sarkar | 65/418 |
| 4,312,654 | 1/1982 | Sarkar | 118/725 |
| 4,331,462 | 5/1982 | Fleming | 427/39 |
| 4,477,273 | 10/1984 | Lynch et al. | 65/3.12 |
| 4,608,070 | 8/1986 | Roba | 65/420 |
| 4,711,747 | 12/1987 | Halter | 264/410 |
| 5,106,402 | 4/1992 | Geittner et al. | 65/391 |
| 5,145,509 | 9/1992 | Bachmann et al. | 65/391 |
| 5,188,648 | 2/1993 | Geittner et al. | 65/391 |

OTHER PUBLICATIONS

*Kirk–Othmer Encyclopedia of Chemical Technology*, 4th Ed., vol. 10, pp. 514–537 (1994).

*Primary Examiner*—John Hoffmann
*Attorney, Agent, or Firm*—Eugen E. Pacher

[57] ABSTRACT

Bubble-free core glass can be deposited at relatively high rate (e.g., >0.3 gm $SiO_2$/minute, preferably 0.6 gm $SiO_2$/minute or more) by MCVD if the deposition conditions are appropriately selected. For instance, a relatively high torch traverse speed, a relatively low sintering temperature, and/or relatively low gas flow rates can facilitate high rate deposition of bubble-free glass. By way of example, conditions are disclosed that yielded essentially bubble-free core glass ($\Delta=0.35\%$) at a rate of 1 gm $SiO_2$/minute.

5 Claims, 1 Drawing Sheet

HIGH RATE MCVD METHOD OF MAKING AN OPTICAL FIBER PREFORM

FIELD OF THE INVENTION

This invention pertains to optical fiber manufacture using Modified Chemical Vapor Deposition (MCVD) for making the fiber preform.

BACKGROUND

Optical fiber preform manufacture by MCVD is known, and does not require detailed exposition. See, for instance, U.S. Pat. No. 4,217,027, and the article on Fiber Optics in *Kirk-Othmer Encyclopedia of Chemical Technology,* 4th Ed., Vol. 10, pp. 514–537 (1994), both incorporated herein by reference.

Briefly, preform manufacture by MCVD involves formation of a cladding material layer on the inner surface of a substrate tube, followed by deposition of particulate core material on the cladding material. The core material is doped to have higher refractive index than the cladding material. Typically, the substrate tube is silica, the cladding material is silica, or fluorine-doped silica, and the core material is germanium-doped silica. MCVD involves flowing gaseous precursor chemicals (e.g., $SiCl_4$, or $SiCl_4$ and $GeCl_4$), together with oxygen and an optional carrier gas such as He into the bore of the substrate tube. An external torch heats the tube to form a moving hot zone that causes in one pass deposition of glass particles on the tube wall and sintering of the deposited particles into a glass layer. The MCVD-formed glassy particles are frequently referred to as "soot", and this terminology will also be used herein.

MCVD is widely used in commercial practice, accounting for a significant fraction of optical transmission fiber produced worldwide. In view of this significant commercial use, it is evident that any process change that can result in lower production cost is potentially of great importance.

In many, if not all, commercial embodiments of the MCVD process, the rate-limiting step in preform production is core deposition. Thus, any process changes that shorten the time required for core deposition (or increase the amount of core glass deposited per unit time) would translate into increased throughput and therefore into lower production cost.

However, as those skilled in the art know, merely increasing the deposition rate of core material beyond currently used values (e.g., more than about 0.25 gm $SiO_2$/minute) typically does not result in acceptable product. Specifically, such increase typically results in bubbles in the core material, with at least some of the bubbles remaining in the core during sintering, preform collapse and fiber drawing. Of course, fiber with bubbles in the core is generally unsuitable for optical fiber communication purposes.

Thus, it would be highly desirable to be able to form bubble-free core material at a rate in excess of currently used rates. This application not only discloses the mechanism of bubble formation but also discloses process changes that make possible the deposition of bubble-free core material at rates in excess of current rates.

Undoped $SiO_2$ or silica glass doped, in addition to Ge, with a substantial amount of one or more elements other than Ge (e.g., F or P) can be deposited by MCVD at relatively high rates (e.g., 0.6 gm $SiO_2$/minute) substantially without bubble formation. However, silica doped with Ge and a substantial amount (e.g., more than 1 mole %) of dopant or dopants other than Ge is generally not found in the core of conventional optical fibers, e.g., Lucent Technologies' 5D® or True Wave® fiber. The instant invention is thus primarily directed towards increasing the rate of MCVD deposition of essentially bubble-free $GeO_2$-containing silica-based core glass comprising at most 1 mole % of constituents other than $SiO_2$ and $GeO_2$, and only secondarily towards further increasing the MCVD deposition rate of essentially bubble-free $GeO_2$-containing silica-based glass comprising more than 1 mole % constituents other than $SiO_2$ and $GeO_2$.

Glossary and Definitions

By "core material" or "core glass" we mean herein material or glass that is up-doped (i.e., $\Delta>0$) with Ge, typically containing at least 1 mole % of $GeO_2$, and that contains at most 1 mole % of constituents other than $SiO_2$ and $GeO_2$.

By a "conventional" torch we mean herein a torch (typically oxyhydrogen torch) having a multiplicity of interleaved orifices for oxygen and hydrogen, arranged in a substantially linear array such that a relatively narrow region of a rotating substrate tube is heated. The heated region is referred to as the hot zone.

By "performance-affecting" bubbles we mean bubbles in optical fiber that measurably affect an optical fiber property, e.g., fiber strength or loss.

Closed voids in the as-deposited material (soot layer) herein are typically referred to as "pores", and uncollapsed voids in the sintered material are typically referred to as "bubbles".

"$\Delta$" herein has its conventional meaning, namely, $(n_{core}-n_{clad})/n_{clad}$, where $n_{core}$ and $n_{clad}$ are the refractive index of the fiber core and of the cladding surrounding the core, respectively.

SUMMARY OF THE INVENTION

During our study of the MCVD process we discovered that Ge is associated with bubble formation in the core material. For instance, we found that bubble-free undoped pure silica can readily be deposited at a rate far in excess of typical prior art rates of core material deposition.

We also succeeded in establishing the mechanism by which the Ge in the core material effects bubble formation. Briefly, a bubble typically is formed when the vapor pressure (due to $GeO_2$ vaporization) inside a closed pore exceeds the driving force for collapse of the pore.

The above mentioned insights into the MCVD of Ge-doped $SiO_2$ enabled us to recognize process changes that facilitate deposition of pore-free core material at rates significantly in excess of prior art rates. Among the process changes are:

a) steps directed towards avoidance of formation in the as-deposited core material of large pores that can not be eliminated during sintering;

b) steps directed towards forming a substantially homogeneous distribution of $GeO_2$ in the as-deposited core material;

c) use of a relatively low sintering temperature; and d) deposition of a relatively thin layer of as-deposited core material.

More specifically, our invention is embodied in a method of making silica-based optical fiber having a deposited cladding and a core. The method comprises making an optical fiber preform, and drawing the optical fiber from the preform. The preform is made by a process that comprises formation of a layer of cladding material on the interior wall of a silica substrate tube, and that also comprises deposition of core material on the cladding material. The deposited cladding material and the core material are both formed by MCVD (modified chemical vapor deposition), with the core material typically containing at least 1 mole % $GeO_2$ and at most 1 mole % of constituents other than $SiO_2$ and $GeO_2$.

Significantly, in a first aspect of the invention the core material is deposited at a rate in excess of 0.3 gm $SiO_2$/min, preferably 0.6 gm $SiO_2$/minute or more, substantially larger than prior art core material deposition rates. One or more of the core material deposition conditions are selected such that, after sintering of the deposited core material, the sintered core material is free of performance-affecting bubbles.

In a further aspect of the invention, at least a part of the deposited cladding material comprises more than 1 mole % of constituents other than $SiO_2$ and $GeO_2$, and at least part of the cladding is deposited at a rate in excess of 0.6 gm $SiO_2$ minute, larger than prior art MCVD deposition rates for essentially bubble-free material of the same composition. As in the first aspect, one or more of the deposition conditions are selected such that, after sintering of the relevant deposited material, the material is free of performance-affecting bubbles.

DETAILED DESCRIPTION

The equilibrium size of a bubble is determined by two opposing driving forces. The bubble is expanded by the vapor pressure due to $GeO_2$ vaporization, with the $GeO_2$ vapor pressure increasing with the local concentration of $GeO_2$ available for vaporization at a pore surface. The expansion of the bubble is restrained by a sintering force which seeks to reduce the surface energy, and which is inversely proportional to the bubble radius.

We have found that, for essentially bubble-free formation of Ge-doped silica glass by MCVD, the deposition conditions should be selected such that the driving force for sintering ($F_s$) exceeds the expansive force ($F_v$) due to $GeO_2$ vaporization. That is to say, deposition conditions should be selected such that $$F_s = (2\gamma)/r > F_v = kX p_o \exp(-\Delta G/RT) \quad (1),$$ where y is the surface tension of glass, r is the pore radius, k is the chemical activity coefficient of $GeO_2$ in $SiO_2$, X is the local $GeO_2$ concentration adjacent to the bubble, $p_o$ is the known pre-exponential term of the vapor pressure of $GeO_2$, AG is the activation energy for $GeO_2$ vaporization, R is the universal gas constant, and T is the absolute temperature.

According to equation 1 there exists a critical radius $r_c$ below which the bubble (or closed pore) will shrink and disappear, due to the predominance of the sintering force over the vapor pressure force, and above which the bubble can not be collapsed. The critical radius $r_c$ is given by equation 2.

$$r_c = (2\gamma)/kX p_o \exp(-\Delta G/RT). \quad (2)$$

It is desirable to select the deposition conditions such that $r_c$ is relatively large, whereby even relatively large closed pores can be eliminated by sintering.

The above theoretical description is provided for tutorial purposes only, and the claimed invention does not depend on the correctness and/or completeness of the theoretical description.

Figure 1:
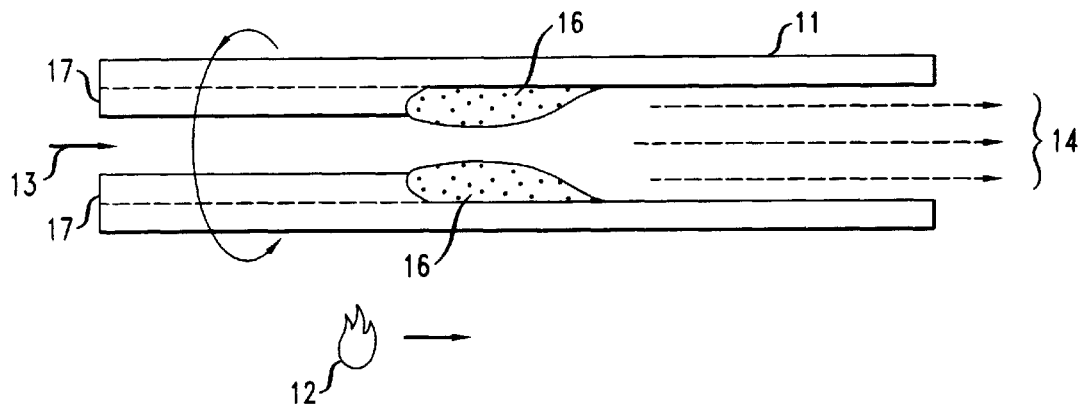
FIG. 1 schematically depicts the MCVD process.

FIG. 1 schematically illustrates MCVD, wherein numerals 11–14 designate the substrate tube, torch, high purity gas stream and exhaust gas stream, respectively, and numerals 16–17 refer to the deposited soot and the sintered glass, respectively. After completion of the glass deposition, the substrate tube with the de posited glass is collapsed into a solid rod.

The discussion below will primarily relate to the formation of core material. However, the principles of our invention can also be used to increase the deposition rate of material containing more than 1 mole % of constituents other than $SiO_2$ and $GeO_2$.

I. Avoidance of Large Pores in the Soot Deposit

We have identified changes in the deposition conditions that facilitate avoidance of formation of relatively large pores that can not be collapsed during sintering, facilitating high rate production of essentially bubble-free core material.

A) When MCVD-formed soot particles are very small, they tend, due to surface forces such as electrostatic attraction and Van der Waals bonding, to form relatively large aggregates of particles. These aggregates are deposited downstream of the torch, the deposit containing large pores between aggregates, with the pore size typically being proportional to the size of the aggregates of the soot articles. These pores frequently can not be eliminated during sintering, and thus formation of such pores is undesirable.

Aggregate formation can be reduced or prevented by changing deposition conditions such that the soot particles have relatively large size, resulting in a smaller surface force per unit weight of soot, and thus resulting in decreased aggregate formation.

Soot particles grow in size due to agglomeration by Brownian collisions. The frequency of Brownian collisions increases with time and temperature. Thus, deposition conditions for core material advantageously are selected such that the soot particles have a relatively long residence time in the high temperature region of the substrate tube. Furthermore, a relatively high oxygen partial pressure in the reactant stream leads to increased oxidation rates Of $SiCl_4$ and $GeCl_4$. Complete oxidation Of $SiCl_4$ and $GeCl_4$ substantially eliminates the weak chemical bonding among the small soot particles, with attendant decrease or elimination of aggregate formation.

The above considerations imply that, in order to avoid aggregate formation (and thus to avoid formation of large pores), one or more of the following should be implemented. a) The temperature of the hot zone should be relatively high; b) the residence time in the hot zone in the substrate tube should be relatively long (requiring that the gas flow rate through the substrate tube be relatively low, and/or that the hot zone be relatively wide); and c) that the $O_2$ partial pressure in the gas stream be relatively high.

B) During MCVD, oxidation of $SiCl_4$ and $GeCl_4$ typically occurs before the chemicals reach the maximum temperature region of the substrate tube. The oxidation is exothermic, producing a significant temperature increase in the gas phase. At some point upstream of the torch, the center-line temperature in the gas phase can exceed the tube wall temperature, and the temperature gradient provides a driving force for the thermophoretic deposition of soot particles upstream of the torch. The soot particles that were deposited upstream of the torch will be buried under the soot which is deposited downstream of the torch in the subsequent pass. We have found that any mismatch in the packing density between soot particles deposited in sequential passes can cause pores of relatively large size, including pores that exceed the critical bubble size and therefore can not be eliminated by subsequent processing, resulting in performance-affecting bubbles.

We have determined that the above-described upstream deposition of soot can, inter alia, be avoided by one or more of the following changes in deposition conditions.

a) a relatively low concentration of $SiCl_4$ and $GeCl_4$ in the gas stream to reduce the oxidation-generated heat per unit volume;

b) providing a relatively wide hot zone, such that the oxidation process is spread out over a relatively wide spatial region, thereby avoiding a large increase in the gas phase temperature; and c) pre-heating the tube wall upstream of the hot zone to prevent soot deposition.

II. Homogeneous $GeO_2$ Distribution

Equation 2 shows that a smaller concentration of $GeO_2$ results in a larger critical radius. The average $GeO_2$ concentration of the core material is of course dictated by the waveguide design, exemplarily being a few percent. However, we have found that any non-homogeneous distribution of $GeO_2$ dopant among soot particles will result in increased $GeO_2$ concentration in some local regions. For instance, if a pore is located adjacent to a 100% $GeO_2$ soot particle then the critical radius of the bubble is decreased by a factor of about 30, relative to an otherwise identical pore that is adjacent only to silica particles doped with 3.3 mole % $GeO_2$.

We have also found that a substantially homogeneous distribution of $GeO_2$ in the soot particles can be attained by appropriate selection of processing conditions, namely, use of a relatively broad hot zone. $GeCl_4$ oxidation occurs at a lower temperature than $SiCl_4$ oxidation, and $GeO_2$ particles are thus formed in a relatively low temperature region of the hot zone. These $GeO_2$ particles provide nucleation sites for $SiO_2$ particles which form subsequently at a higher temperature. Since the $GeO_2$ particles are encapsulated by $SiO_2$ they are readily dissolved in the silica. Upon dissolution in silica, the Ge dopant has a much lower vapor pressure (X<<1), and does not prevent the collapse and disappearance of the bubbles. Thus, provision of a relatively wide hot zone (possibly shaped to enhance the chemical reaction) can reduce or eliminate bubble formation. On the other hand, when both $GeO_2$ and $SiO_2$ particles are formed substantially simultaneously within a conventional hot zone, then discrete $GeO_2$ particles together with silica soot are deposited further downstream. Upon sintering, these discrete $GeO_2$ particles typically are trapped within closed pores in silica soot and vaporize to form performance-affecting bubbles.

A relatively broad hot zone can be obtained by a variety of means, and all are contemplated. Among them are: a) relatively high torch traverse velocity; b) use of an auxiliary torch; and c) use of a torch with multiple burners.

III. Relatively Low Sintering Temperature

Equ. 2 also shows that a larger critical radius and a lower $GeO_2$ vapor pressure can be obtained by use of a relatively low sintering temperature. Thus, we have found that bubble formation can be reduced or eliminated inter alia by use of a relatively low sintering temperature, consistent with throughput requirements.

IV. Relatively Thin Soot Layer

We have also found that fewer closed pores will be trapped upon sintering if the soot layer is relatively thin. For instance, a thinner soot layer facilitates $GeO_2$ vaporization and subsequent $GeO_2$ vapor phase diffusion among soot particles before closed pores are formed.

The as-deposited thickness t of a soot layer is given by $$t=\eta\dot{C}/\pi DV\rho, \tag{3}$$

wherein $\rho$ is the soot density, $\eta$ is the deposition efficiency, $\dot{C}$ is the rate of chemical delivery in equivalent weight of oxide per unit time, D is the inner diameter of the substrate tube, and V is the torch velocity.

As can be seen from equ. 3, a thinner soot layer can be obtained by, for instance, a relatively high torch traverse velocity.

In summary, formation of large pores due to aggregates inter alia can be reduced or avoided by providing for a relatively high torch temperature, a relatively long residence time in the hot zone (facilitated for instance by a relatively low gas flow rate and/or a relatively wide hot zone), and/or a relatively high $O_2$ partial pressure.

Furthermore, formation of large pores due to upstream deposition can inter alia be reduced or avoided by providing a relatively low concentration of $SiCl_4$ and $GeCl_4$, by spreading the oxidation process over a relatively wide region, and/or by pre-heating the tube upstream of the main torch.

Non-uniform $GeO_2$ distributions can inter alia be reduced or avoided by provision of a relatively broad hot zone, e.g., by use of a relatively high torch traverse velocity, by use of an auxiliary torch located upstream of the main torch, or by use of a torch with multiple burners.

A relatively large critical radius or low $GeO_2$ vapor pressure can inter alia be obtained (and bubble formation thereby reduced or eliminated) by use of a relatively low sintering temperature.

Bubble formation can inter alia be reduced or eliminated by formation of a relatively thin soot layer, e.g., by use of a relatively high torch traverse velocity.

As can be seen from the above discussion, our insights into the mechanism of bubble formation in Ge-doped silica formed by MCVD have enabled us to identify deposition conditions that can be selected to facilitate formation of bubble-free material at rates in excess of prior art rates. The above list of effective deposition conditions may not be exhaustive, and further study may identify other suitable conditions.

Those skilled in the art will appreciate that a desired high deposition rate of bubble-free Ge-doped silica may be attained by appropriate adjustment of one or more deposition conditions, and that choice of conditions frequently will depend on available apparatus and/or personal preference. Thus, it is in general not possible to provide universally applicable limits on the deposition conditions. However, having available our disclosure of relevant deposition conditions, and of what change (e.g., increase or decrease) of a given condition favors bubble-free deposition, one skilled in the art will generally be able to determine suitable conditions with only a modest amount of routine experimentation. The selection of an appropriate deposition condition will frequently require balancing of competing requirements, as is frequently the case in technology.

Guidance regarding appropriate deposition conditions will also be derived from the examples below. In the data below, Tables 1–4 show prior art conditions, and Examples 1–7 give exemplary conditions according to the invention.

A prior art deposition rate of about 0.25 gm $SiO_2$/min was attained with the following deposition conditions:

TABLE 1

| | |
|---|---|
| $SiCl_4$ flow rate: | 1.06 gm/minute |
| $GeCl_4$ flow rate | 0.168 gm/minute |
| $O_2$ flow rate | 2178 sccm |
| He flow rate | 1260 sccm |
| torch speed | 5.5 cm/minute |
| max. temp. in hot zone | >2200° C. |
| hot zone width | as obtained with conventional torch |

The above conditions resulted in essentially bubble-free material having Δ=0.31%.

Those skilled in the art will appreciate that the above disclosed conditions are not unique, and that other sets of conditions capable of producing essentially bubble-free core material with Δ about 0.3% may exist. However, such prior art conditions typically also will yield deposition rates of about 0.25 gm $SiO_2$/minute.

Table 2 shows prior art deposition conditions that also resulted in bubble-free core material. The substrate tube was heated with a conventional torch only. See, for instance, U.S. Pat. No. 4,477,273.

TABLE 2

| | |
|---|---|
| $SiCl_4$ flow rate | 0.809 gm/min |
| $GeCl_4$ flow rate | 0.1414 gm/min |
| $O_2$ flow rate | 2057 sccm |
| He flow rate | 0 |
| torch speed | 7.5 cm/min |
| max. temp. in hot zone | >2200° C. |
| Δ | 0.40% |
| deposition rate | 0.208 gm $SiO_2$/min |

EXAMPLE 1

The following deposition conditions resulted in bubble-free core material (Δ=0.35%) at a rate of 1.00 gm $SiO_2$/minute.

| | |
|---|---|
| $SiCl_4$ flow rate | 8.076 gm/minute |
| $GeCl_4$ flow rate | 3.338 gm/minute |
| $O_2$ flow rate | 4187 sccm |
| He flow rate | 2069 sccm |
| torch speed | 11 cm/min |
| max. temp. in hot zone | 2200° C. |
| hot zone width | as obtained with conventional torch |

In the following three examples, the substrate tube was heated with a torch as disclosed in co-assigned U.S. patent application titled "Modified Chemical Vapor Deposition Using Independently Controlled Thermal Sources," Ser. No. 09/092,380, filed Jun. 5, 1998 by S. F. Marszalek et al., in addition to a conventional torch. The deposited core materials were essentially bubble-free.

EXAMPLE 2

| | |
|---|---|
| $SiCl_4$ flow rate | 6.73 gm/minute |
| $GeCl_4$ flow rate | 2.15 gm/minute |
| $O_2$ flow rate | 4200 sccm |
| He flow rate | 3448 sccm |
| torch speed | 11 cm/minute |
| linear torch temperature | 1800° C. |
| max. temp. in hot zone | 2200° C. |
| Δ | 0.32 |
| deposition rate | 0.89 gm $SiO_2$/minute |

EXAMPLE 3

| | |
|---|---|
| $SiCl_4$ flow rate | 4.711 gm/min |
| $GeCl_4$ flow rate | 1.68 gm/min |
| $O_2$ flow rate | 3620 sccm |
| He flow rate | 2069 sccm |
| torch speed | 8.1 cm/min |
| linear torch temp. | 1900° C. |
| max. temp. in hot zone | 2150° C. |
| Δ | 0.39 |
| deposition rate | 0.72 gm $SiO_2$/minute |

EXAMPLE 4

| | |
|---|---|
| $SiCl_4$ flow rate | 5.721 gm/minute |
| $GeCl_4$ flow rate | 1.848 gm/minute |
| $O_2$ flow rate | 3870 sccm |
| He flow rate | 2069 sccm |
| torch speed | 11 cm/minute |
| linear torch temperature | 1800° C. |
| max. temp. in hot zone | 2150° C. |
| Δ | 0.32 |
| deposition rate | 0.84 gm $SiO_2$/minute |

The next example shows deposition conditions that resulted in bubble-free core material. The substrate tube was heated with a conventional torch only. The resulting core glass has the same value of Δ as the glass of Table 2.

EXAMPLE 5

| | |
|---|---|
| $SiCl_4$ flow rate | 6.73 gm/min |
| $GeCl_4$ flow rate | 3.276 gm/min |
| $O_2$ flow rate | 2950 sccm |
| He flow rate | 4138 sccm |
| torch speed | 11 cm/min |
| max. temp. in hot zone | 2200° C. |
| Δ | 0.40% |
| deposition rate | 0.932 gm $SiO_2$/min |

The next table shows prior art deposition conditions for essentially bubble-free glass that is doped with Ge and F, with the F content being more than 1 mole %, and with the substrate heated with a conventional torch only.

TABLE 3

| | |
|---|---|
| $SiCl_4$ flow rate | 3.03 gm/min |
| $GeCl_4$ flow rate | 0.4704 gm/min |
| $C_2F_6$ flow rate | 31 sccm |
| $O_2$ flow rate | 2800 sccm |
| He flow rate | 100 sccm |
| torch speed | 13 cm/min |
| max. temp. in hot zone | >2200° C. |
| Δ | −0.085% |
| deposition rate | 0.5 gm $SiO_2$/min |

The next example shows exemplary deposition conditions for essentially bubble-free Ge- and F-doped glass having the same value of Δ as resulted from the prior art conditions of Table 3. The glass had F content greater than 1 mole %, and the substrate was heated with a conventional torch only.

EXAMPLE 6

| | |
|---|---|
| SiCl$_4$ flow rate | 6.73 gm/min |
| GeCl$_4$ flow rate | 2.446 gm/min |
| C$_2$F$_6$ flow rate | 147.1 sccm |
| O$_2$ flow rate | 3456 sccm |
| He flow rate | 4138 sccm |
| torch speed | 11 cm/min |
| max. temp. in hot zone | 2200° C. |
| Δ | −0.085% |
| deposition rate | 0.82 gm SiO$_2$/min |

Table 4 shows prior art conditions that resulted in bubble-free silica doped with Ge and F, with the F-content being greater than 1 mole %, and Example 7 shows corresponding conditions according to the invention that yielded bubble-free Ge- and F-doped glass of essentially the same value of Δ. In both cases the substrate was heated with a conventional torch only.

TABLE 4

| | |
|---|---|
| SiCl$_4$ flow rate | 2.895 gm/min |
| GeCl$_4$ flow rate | 0.619 gm/min |
| C$_2$F$_6$ flow rate | 15.5 sccm |
| O$_2$ flow rate | 3140 sccm |
| He flow rate | 3000 sccm |
| torch speed | 11 cm/min |
| max. temp. in hot zone | >2200° C. |
| Δ | 0.040% |
| deposition rate | 0.60 gm SiO$_2$/min |

EXAMPLE 7

| | |
|---|---|
| SiCl$_4$ flow rate | 8.076 gm/min |
| GeCl$_4$ flow rate | 1.806 gm/min |
| C$_2$F$_6$ flow rate | 15.5 sccm |
| O$_2$ flow rate | 3775 sccm |
| He flow rate | 2069 sccm |
| torch speed | 11 cm/min |
| max. temp. in hot zone | 2180° C. |
| Δ | 0.041% |
| deposition rate | 1.086 gm SiO$_2$/min |

The examples, in addition to providing sets of process parameters that have been found to facilitate high rate deposition of essentially bubble-free material, also illustrate the above discussed principles.

For instance, the examples generally show that a relatively high torch speed, resulting in a relatively thin soot layer, is beneficial. Compare, for instance, Table 1 with examples 1–7.

The examples also are consistent with the proposition that a relatively low sintering temperature is beneficial.

Furthermore, the examples are consistent with the teaching that relatively low gas (i.e., He and O$_2$) flow rate is beneficial. Compare, for instance, Table 1 and Example 1. The SiO$_2$ deposition rate in the latter is about 4 times the deposition rate in the former. On the other hand, the He and O$_2$ flow rates in the latter are only about twice the flow rates in the former.

Figure 2:
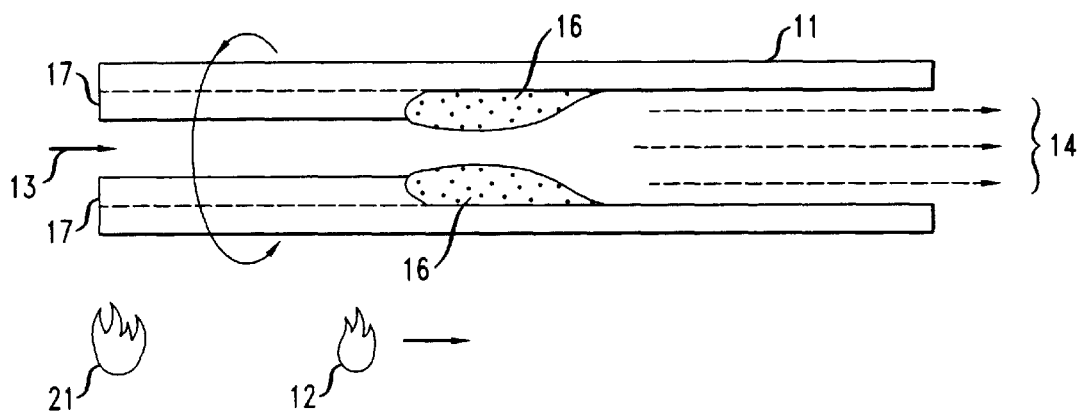
FIG. 2 schematically depicts a variation of the MCVD process that includes pre-heating of the reactants.

The examples are also consistent with the teaching that pre-heating (exemplarily to a temperature above 1000° C.) of the reactants upstream of the hot zone (thereby avoiding upstream deposition of soot) is beneficial. See FIG. 2, which schematically illustrates the MCVD process including pre-heating of the reactants by means of heater 21. The examples are also consistent with other parameter changes discussed above, e.g., provision of relatively high O$_2$ partial pressure.

The invention claimed is:

1. Method of making a silica-based optical fiber having a deposited cladding and a deposited core, the method comprising a) making an optical fiber preform by a process that includes deposition of cladding material on an interior wall of a substrate tube, and that further includes deposition of core material on the cladding material, said cladding material and core material being formed by modified chemical vapor deposition including sintering of said cladding material and said core material, wherein said core material consists essentially of SiO$_2$ and at least 1 mole % GeO$_2$; and b) drawing optical fiber from the preform;

CHARACTERIZED IN THAT c) the core material is deposited at a rate of more than 0.6 gm SiO$_2$/minute, with deposition conditions selected such that in said core material a driving force for sintering $F_s$ exceeds an expansive force $F_v$ due to GeO$_2$ evaporation, whereby in said optical fiber the core material is substantially free of performance—affecting bubbles.

2. Method of claim 1, wherein the core material is deposited at a rate of 1 gm SiO$_2$/minute or more.

3. Method of claim 1, wherein said deposition conditions include a torch traverse speed, said torch traverse speed being greater than 7.5 cm/minute.

4. Method of claim 1, wherein said deposition conditions include a maximum temperature in a hot zone, said maximum temperature in the hot zone being at least 2000° C.

5. Method of claim 1, wherein said deposition conditions include preheating, to a temperature above 1000° C., the reactants for said modified chemical vapor deposition at a location upstream of a hot zone.

* * * * *